Patented Oct. 10, 1939

2,175,955

UNITED STATES PATENT OFFICE 2,175,955

CULINARY SALT

Frederick Craig Ewan Harry, Maroubra, near Sydney, New South Wales, and Henry Herbert York, Killara, near Sydney, New South Wales, Australia, assignors to Chemtex Limited, Alexandria, near Sydney, New South Wales, Australia, a company No Drawing. Application November 6, 1937, Serial No. 173,250. In Australia November 19, 1936

2 Claims. (Cl. 99—143)

This invention relates to improvements in culinary salts and to the employment of the said improved culinary salts as hereinafter set out.

Amongst the objects of the present invention are to employ selected salts which, per se, may be used in an improved table salt in association with common salt (sodium chloride) giving thereto improved characteristics such as greater freedom from clogging of shakers in humid conditions and an enhanced medicinal value. Further objects are to produce a selection of salts which, when applied to foodstuffs destined to be cooked, or which are being cooked, will react therewith during the cooking operation to give a marked improvement in the cooked food and in the cooking process by (a) shortening the time of preparation, thus effecting an economy of both time and fuel, (b) rendering the food more tender and, we consider, more palatable than would be the case otherwise, thus allowing foodstuffs of a so-called poor quality to be effectively employed and (c), in the case of green vegetables, preserving the natural colour without the addition of other materials. Furthermore, it has been found that, by the employment of salts, as hereinafter set out, a marked lessening in shrinkage of cooked foodstuffs results.

We have ascertained that normal tri-basic soluble salts of the acids of phosphorus, or mixtures which in solution produce the equivalent irons, exert a remarkable action upon the cooking of foodstuffs. We have further ascertained that the addition of soluble sulphates and/or soluble carbonates and/or bicarbonates to the phosphates give still more effective results. Naturally the salts selected must be either non-toxic or in non-toxic amounts and their proportions, in order to give the desired results, may be such that they do not adversely affect the palatability of the preparation. As a carrier for these salts we employ sodium chloride (common salt).

We have ascertained that a selection of salts, as above set out, results in a more rapid cooking of foodstuffs together with a softening and mellowing of texture and that, when applied to the cooking of green vegetables, the natural colour is preserved. The more rapid cooking of foodstuffs, together with the softening and mellowing of texture achieved, is the outcome of an accelerated hydrolysis of the food substances, such as the proteins in meats and the starches in vegetables, and consequently the salts selected, in accordance with this invention, are such that they have the effect of increasing or accelerating the hydrolysis of food substances during the cooking of foods. The break down or degradation of substances, such as starches and proteins, which takes place to a greater or less extent during the cooking process (this extent depending upon the foodstuff chosen and the nature and conditions of the cooking process) depends upon a number of factors of a complex nature including denaturation and coagulation in the case of proteins, salt formation and precipitation, osmotic swelling in the case of proteins and certain of the carbohydrates and, with regard to colloids in general, hydrogen-ion concentration and hydrolysis generally. By the employment of the term hydrolysis it is to be understood that we include generally the factors, as set out in the preceding sentence, which contribute to the degradation of food substances.

It is well known that acids and alkalis accelerate hydrolysis in general but acids and alkalis, generally speaking, would be objectionable for the purposes of the present invention in that they would tend to be injurious to health in the majority of cases, destructive of the palatability of the foodstuff as a general rule and useless as a substitute for or addition to table salt. It will be seen, therefore, that the range of selection of suitable materials is limited by the conditions as set out amongst the objects of the invention.

Preparations, in accordance with this invention, have been successfully employed which consisted in a mixture of selected salts, such as a mixture of sodium phosphate, sodium sulphate, sodium bicarbonate and sodium chloride, having a total alkali equivalent of 1.4–1.6 millilitres of normal acid per gram (using methyl orange as indicator). Such preparations are on the alkaline side of the iso-electric point of proteins in general and meat proteins in particular. Foodstuffs, when about to be cooked, are frequently in an acid condition and consequently, in order to produce a condition approaching neutrality, preparations as employed for the purposes of this invention are slightly alkaline in their reaction. Variations in hydrogen-ion concentration on the alkaline side are permissible as long as they do not result in the use of preparations which are injurious to health or which adversely affect the palatability of the foodstuff.

Preparations, intended for use as hereinbefore set out, are preferably such that, per se, they may be used in substitution for table salt (common salt) and the preparations of salts selected have been found to be an improvement upon sodium chloride as a table salt in that they do not clog to the same extent in humid conditions. Furthermore, they have enhanced medicinal properties.

Experiment has shown that a mixture consisting of trisodium phosphate, sodium sulphate, sodium bicarbonate in association with sodium chloride (common salt) serves admirably for the purposes herein specified. We refer generally to commercial salts, that of trisodium phosphate containing a small proportion of sodium carbonate. Where chemically pure trisodium phosphate is employed it is preferred to add a small quantity, say about 0.6 per centum, of sodium carbonate to the preparation. Whilst this is preferable it is not necessary and, on the other hand, amounts of sodium carbonate in excess of 0.6 per centum may be employed as long as they do not impair the palatability of the foodstuff to which the preparation is applied. Where it is proposed to employ the preparation herein specified as a table salt it is essential that the salts incorporated with the sodium chloride are anhydrous or in such a condition of dehydration that they will not tend to impart moisture to the sodium chloride. It is important to note in this respect that normally trisodium phosphate crystallizes with twelve molecules of water of crystallization and that, for the present purpose, we employ anhydrous trisodium phosphate. Furthermore, in the preparation outlined above, the sodium sulphate employed would be anhydrous or the mono-hydrate thereof. Indeed for all purposes it is advantageous that all salts be dehydrated to a condition which will not cause them to impart water of crystallization to admixed sodium chloride, otherwise mixtures carried by sodium chloride may tend to become moist or even sodden. This is particularly apt to occur if sodium phosphate, which normally crystallizes with twelve molecules of water of crystallization, is not dehydrated. This objection is not to the use of the preparation in cooking but to convenience in storing and transporting it.

The salts, as above referred to, are not intended as being restrictive and a variety of equivalents exist which may be employed in place thereof. For example, instead of employing normal trisodium phosphate, hydrogen salts thereof may be employed and the hydrogen-ion concentration of the preparation adjusted to the alkaline side by varying the proportion of normal and acid carbonates. Again, water-soluble salts in general in non-toxic amounts, normal or acid, of one or more of the acids of phosphorus with or without admixed non-toxic salts, normal or acid, of sulphuric and/or carbonic acids may be utilized provided that they do not result in an unpalatable mixture and provided that, in solution, they react alkaline. As examples of equivalents may be specified the potassium salts of the acids referred to and mixed bases may be employed in a satisfactory mixture as, for example, sodium and potassium salts.

As an example of a suitable preparation for use in the cooking of foods, as herein specified, or as an improved table salt, the following is given:

| | Per cent |
|---|---|
| Sodium bicarbonate | 5 |
| Trisodium phosphate (anhydrous) | 7 |
| Sodium sulphate (anhydrous) | 10 |
| Sodium chloride (common salt) | 78 |
| | 100 |

It will, of course, be appreciated that substantial variations in proportions may be employed without departing from the scope of the invention, the chief limiting factor being the adverse effect upon palatability if certain constituents, as hereinafter referred to, are present in excess. For example, as a general rule, an increase in trisodium phosphate above ten per centum will give a definite taste to the mixture, although up to fifteen per centum could be employed, whilst a decrease below four per centum will very markedly affect its usefulness, although a result would still be obtained with two per centum. Again, an increase of sodium bicarbonate beyond, say, ten per centum would result in an unpleasant flavouring effect, although it is possible to employ up to fifteen per centum sodium bicarbonate, whilst some improved cooking effect would still be achieved if no sodium bicarbonate were present at all. Sodium sulphate may not be increased above, say, twenty-five per centum without causing an unpleasant taste whilst omission of the sodium sulphate from the preparation will still result in a superior cooking effect to that obtained by employing sodium chloride alone. Again, higher concentrations than those specified may be employed in the cooking of foodstuffs if smaller amounts of the preparation are employed and the example given, with the subsequent variation in range set out, is intended as a yardstick with which to measure amounts of preparations compounded in accordance with this invention against amounts of sodium chloride usually employed or employable in culinary operations. It will be obvious that it would be impossible to exhaustively define variations of concentration of ingredients but, with the aid of the example given and the limits of concentration set out, a large range of mixtures of the indicated salts may be prepared without difficulty all having enhanced effects as set out in this specification.

Satisfactory results have been obtained in applying the preparation to the cooking of foodstuffs, when the various salts, as herein referred to, are mixed in such proportion that the alkalinity is 1.4–1.6 millilitres per gram when titrated against normal acid solutions (using methyl orange as indicator); if a variation is made it is preferred to render the preparation more alkaline although a preparation which is somewhat less alkaline may be employed provided that the mixture has an alkaline reaction. Decrease in alkalinity, however, lessens the effectiveness of the preparation. Alkalinity may be increased above that set out provided that it does not impair palatability. The selected salts are preferably mixed with common salt (sodium chloride) and are applied in cooking in the same way, and in substitution for common salt. However, when cooking meats, it has been found that improved results are achieved if the preparation is applied to the surface of the meat prior to cooking thereof. Although the application may be made just prior to cooking of the meat it is believed that still further improved results are obtained if the preparation is applied some time before the meat is to be cooked. It is to be noted that the amount of preparation to be applied to the meat must not be in such proportion as to adversely affect the flavour and amounts, equivalent to the amount of common salt which could be applied without adversely affecting the flavour, give satisfactory results.

Having thus described and ascertained our said invention and the manner in which it is to be performed, we declare that what we claim as new and desire to secure by Letters Patent is:

1. A culinary salt for use in cooking food substances adapted to accelerate hydrolysis thereof, preserve the natural color and lessen shrinkage, consisting of 5% sodium bicarbonate, 7% anhydrous trisodium phosphate, 10% anhydrous sodium sulphate and 78% sodium chloride.

2. A culinary salt for use in cooking food substances adapted to accelerate hydrolysis thereof, preserve the natural color and lessen shrinkage, consisting of 1 to 15% sodium bicarbonate, 4 to 10% trisodium phosphate, 1 to 25% sodium sulphate and the balance sodium chloride, the respective proportions of the ingredients being such that the alkalinity equivalent of the compound salt is 0.4 to 2.0 milliliters of normal acid per gram when methyl orange is used as an indicator.

FREDERICK CRAIG EWAN HARRY.
HENRY HERBERT YORK.